United States Patent [19]

West

[11] 4,174,789
[45] Nov. 20, 1979

[54] SOUP DISPENSER
[75] Inventor: John B. West, Glyndon, Md.
[73] Assignee: Maryland Cup Corporation, Owings Mills, Md.
[21] Appl. No.: 827,678
[22] Filed: Aug. 25, 1977
[51] Int. Cl.² .............................................. G01F 11/22
[52] U.S. Cl. ..................................... 222/240; 222/333; 222/338
[58] Field of Search .............. 222/239, 240, 345, 370, 222/333, 337, 338; 141/285

[56] References Cited

U.S. PATENT DOCUMENTS

| | | | |
|---|---|---|---|
| 1,530,143 | 3/1925 | Snyder | 222/370 X |
| 2,280,166 | 4/1942 | Sinden | 222/240 X |
| 2,417,700 | 3/1947 | McCarty | 222/333 |
| 3,995,777 | 12/1976 | Diez et al. | 222/370 |

FOREIGN PATENT DOCUMENTS 549474 11/1957 Canada ..................................... 222/345
316453 8/1929 United Kingdom ..................... 222/239

Primary Examiner—John P. Shannon
Attorney, Agent, or Firm—Birch, Stewart, Kolasch and Birch

[57] ABSTRACT

A soup dispenser is provided which will dispense liquid, semi-liquid and/or chunky soups, stews, chilis, etc., with equal facility. A motor driven dial configuration of a plurality of measuring chambers or traps is provided at the bottom of a heated reservoir in which an impeller is constantly driven to preclude settling and scorching. The same motor drive is selectively interconnected to rotate the dial and successively register a measuring chamber with a discharge port beneath which a food container can be placed to receive the discharged product. The measuring chambers are vented to atmosphere through the dial and other venting as registry with the discharge opening is respectively effected to assure full discharge of the food product therein.

20 Claims, 10 Drawing Figures

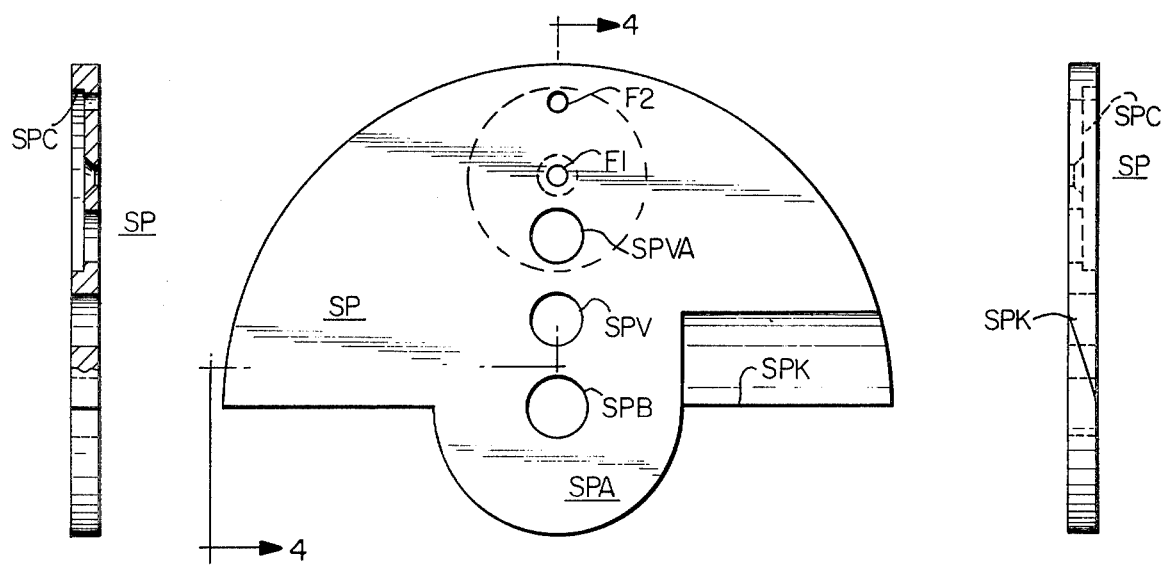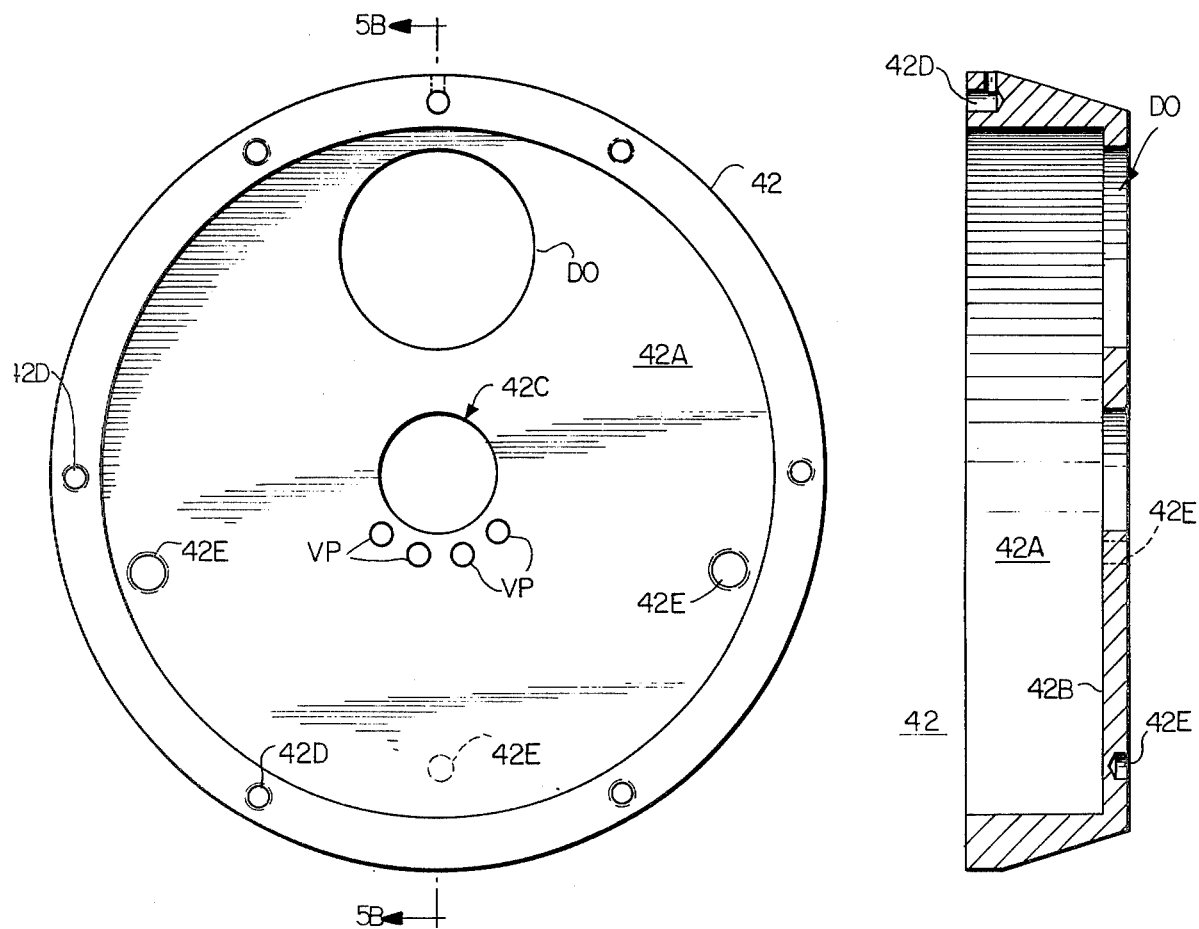

SOUP DISPENSER

FIELD OF THE INVENTION

This invention relates to soup dispensing apparatus and more particularly to soup dispensing and heating apparatus for serving measured quantities of soups by selectively dispensing measured quantities of the soup into containers placed in the apparatus.

BACKGROUND OF THE INVENTION

A number of problems exist with regard to serving soup in its many forms and viscosities with a single serving unit. There is a considerable difference in the characteristics of soups, stews, chilis and the like and accordingly, it is most difficult to provide a universal dispensing device which will handle all these various types of liquid or semi-liquid foods with equal facility.

In order to dispense measured quantities it has been relatively standard in the prior art devices to provide a single trap chamber or the like for measuring a predetermined single quantity into a container.

In large volume servings of soups, stews and the like, however, it is quite often desirable to be able to dispense a bowl of soup, a cup of soup or given variations in measured quantities of soup, stew and the like to various customers.

It is to this problem that the present invention is directed, namely, the provision of dispensing equipment which is equally adapted to highly liquid, semi-liquid, chunky or viscous soups, stews, and the like and which will deliver predetermined quantities with selective variation in those quantities without modification of the equipment.

It is an object of the present invention to provide a new and novel dispensing apparatus for serving measured quantities of hot soups, stews and other liquid food products.

Another object to the present invention is to provide a new and novel soup and stew and liquid food product dispensing apparatus which has self-contained, agitating and heating means and a multiple cavity volumetric discharge plate which dispenses predetermined sequences of unit volumes from a reservoir to thereby discharge known measured quantities of the food product.

Yet another object to the present invention is to provide a new and novel serving apparatus for soups, stews and liquid food products which is equally facile in its handling of highly-liquid, semi-liquid, chunky and/or viscous food products and which is readily disassembled for cleaning purposes after a given use cycle.

These and other objects of the present invention will become more fully apparent with reference to the following specification and drawings which relate to a preferred embodiment of the present invention.

SUMMARY OF THE INVENTION

Basically the soup dispenser and apparatus of the present invention comprises a base stand on which a drive motor is mounted adjacent to a drive shaft and suitable clutch means which in turn are connected through an output shaft which extends upward into a reservoir and which mounts an impeller thereon for rotation within the reservoir.

The reservoir includes a heating device, preferably one of the "CROCK-POT" principle in which the heating elements are on the sides of the reservoir to prevent scorching and provide uniform heating and has a lid through which soups, stews and other liquid or semi-liquid food products may be loaded into the reservoir.

At the lower end of the reservoir is a dial-shaped transfer plate in the general configuration of a deep telephone dial type structure in which a plurality of cavities corresponding to holes in the dial are provided, each cavity defining a given volume for receiving a liquid food product to be dispensed.

The volumetric dial transfer plate is mounted in a housing member which is integrally mounted with the reservoir and open toward the inner end of the reservoir about all of the inner edge thereof and which has a discharge opening of the same size, shape and cross-section as that of each of the multiplicity of volumetric chambers in the transfer plate.

A basically semi-circular sealing plate is provided which overlies the volumetric transfer plate adjacent and overlying the outlet opening the transfer plate housing such that the remainder of the liquid food product in the reservoir is precluded from discharging through the outlet opening in the transfer plate housing and which includes a cutting edge to sever any excess food product which may be projected above a given volumetric cavity in the transfer plate as the transfer plate is being rotated to carry the measured volume of product to the discharge opening.

A venting means included within the sealing plate assembly is provided to vent each of the volumetric measuring cavities as they come into registry with the outlet or discharge opening in the transfer plate housing so as to assure that the more viscous products will discharge under the action of gravity from the discharge opening upon registry of a given volumetric measuring cavity therewith.

A spring-loaded face sealing effect is provided for the sealing plate to preclude any possible binding of the components due to thermal expansion or contraction when the food product is heated or cooled, respectively, before serving.

The transfer plate is driven by a selectively engageable clutching mechanism driven by the drive motor such that by engaging the clutch and counting the number of discharge noises, such as individual splashes or pulsations made by each discharge from a given volumetric dispensing cavity through the discharge opening, the total volume of food product dispensed into a given container can be readily determined.

BRIEF DESCRIPTION OF THE DRAWINGS

FIG. 4A is a top plan view of a sealing plate of the present invention;

FIG. 4B, is a partial cross-section taken along line 4—4 of FIG. 4A;

FIG. 4C, is a side view of the sealing plate of FIG. 4A illustrating a knife-edge configuration thereof;

FIG. 5A, is a top plan view of a transfer plate housing of the present invention;

FIG. 5B, is a cross-section taken along line 5—5 of FIG. 5A;

DETAILED DESCRIPTION OF THE DRAWINGS

Figure 1:
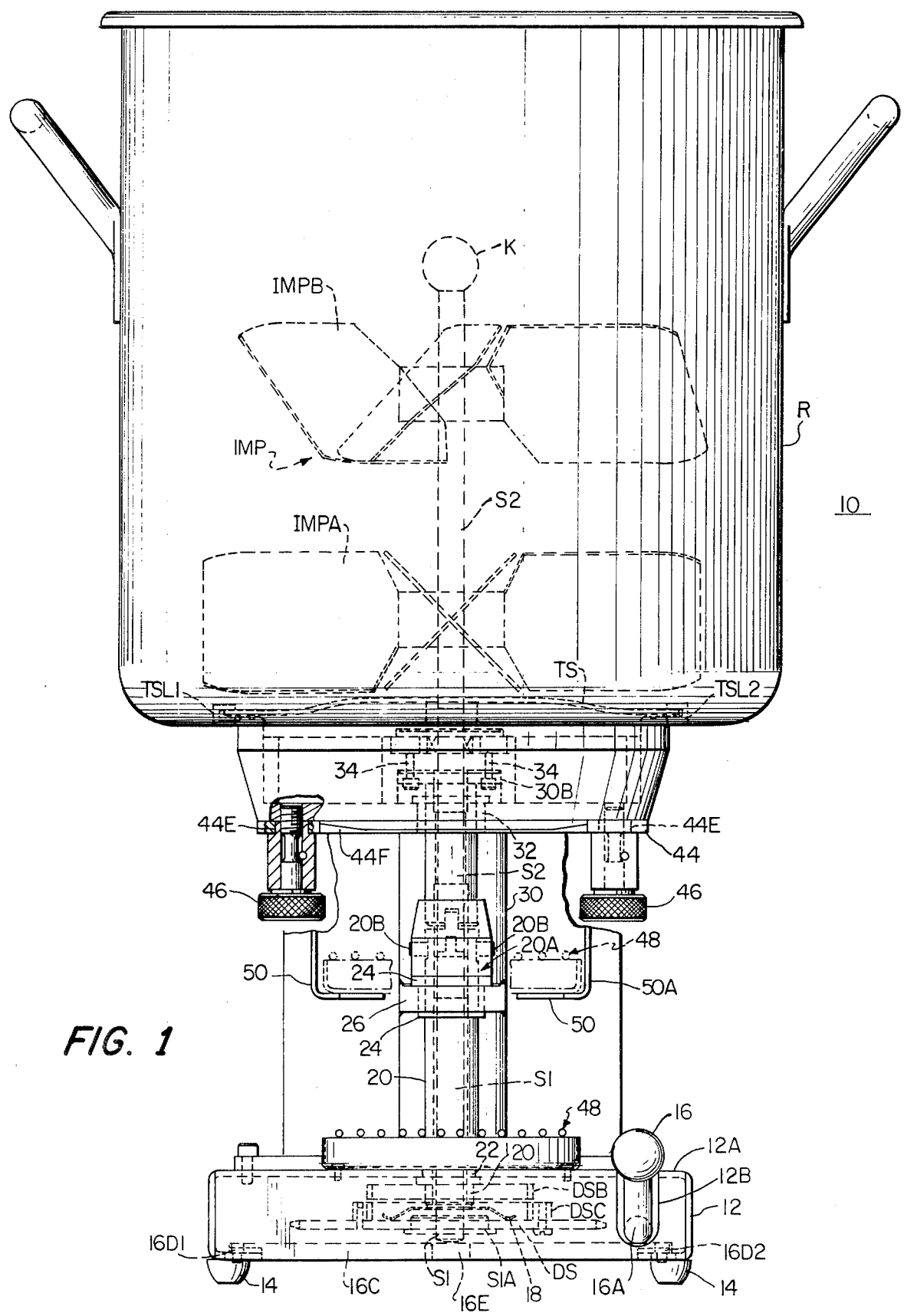
FIG. 1, is a front view of a soup and food product dispensing apparatus of the present invention.
Figure 2:
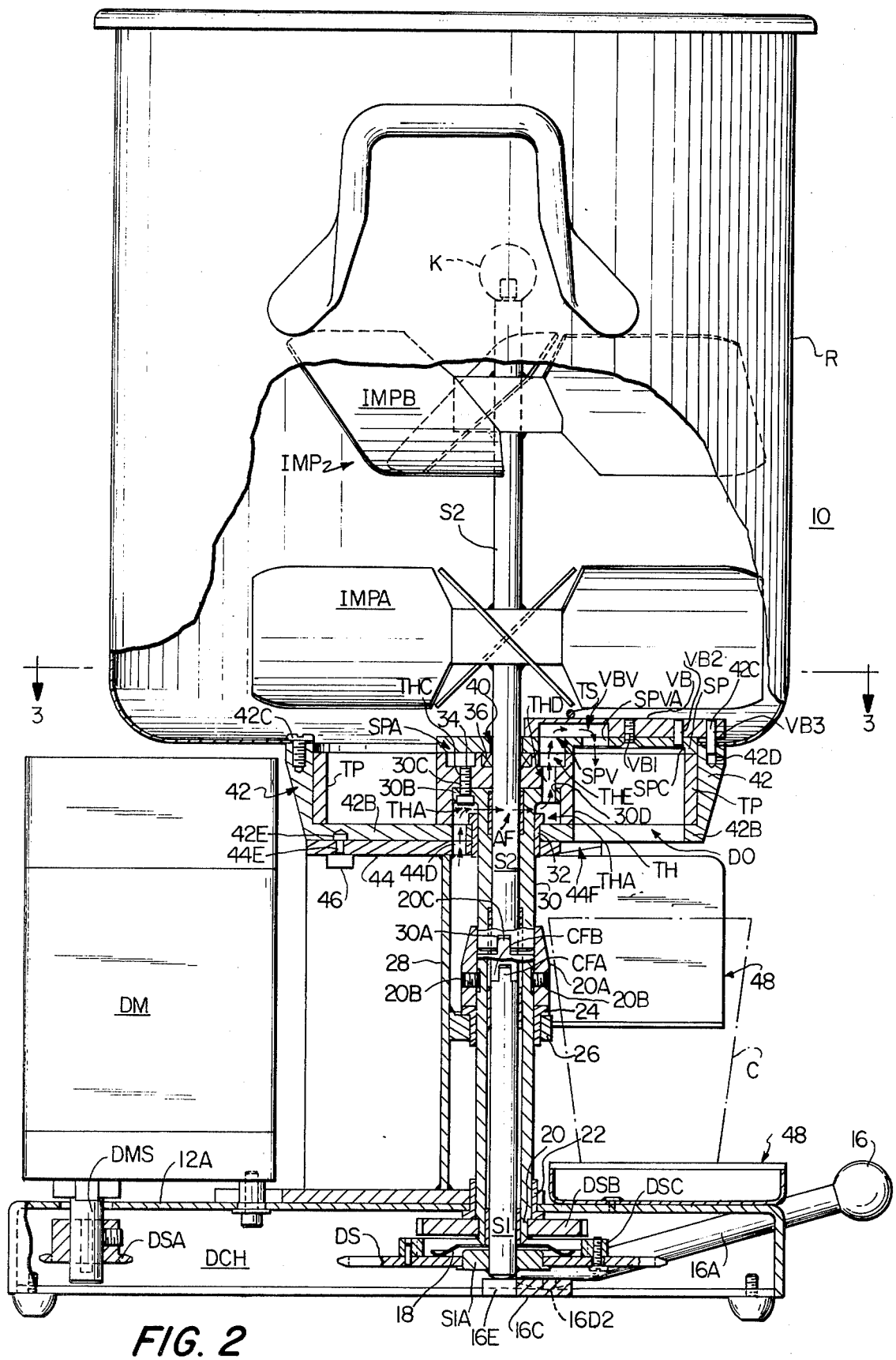
FIG. 2, is a partial central cross-section of FIG. 1 illustrating the internal details thereof.

Referring in detail to the drawings with particular references to FIGS. 1 and 2, the soup and liquid food dispensing apparatus 10 of the present invention is shown as including a base stand 12 which is mounted on rubber feet 14, the latter being in the four corners of the base stand 12 which is of generally rectangular configuration and which is hollow for the purpose of housing a driven sprocket DS at one end thereof and a drive sprocket DSA at the other end thereof beneath the top mounting surface 12A of the said base stand.

Extending through an access slot 12B in the base 12 is a knob 16 affixed to an actuating rocker arm 16A which extends through the slot 12B in the base 12 downward to a transverse rocker plate 16C which has two fulcrum points 16D1, 16D2 and a centrally extended operating pedestal 16E which is orthogonally disposed to the axis of the rocker plate 16C and which extends beneath and in contact with an actuator shaft S1 to be hereinafter more fully described.

The actuating shaft S1 is mounted in a bushing S1A which is substantially integral therewith and which is press fitted through the center of the driven sprocket DS to thereby mount the latter on the actuating shaft S1.

A biasing spring 18 is mounted such that it presses between a vertical drive shaft 20 and the upper surface of the driven sprocket DS to thereby bias the actuating shaft S1 downward into juxtaposition with the operating tab 16E of the actuating lever assembly 16.

Thus, actuation downward of the knob 16 on the manual actuating lever 16A causes the rocker lever 16C to pivot about the pivot points or fulcrums 16D1 and 16D2 and thus raise and lower the actuating extension or lever 16E against the foot of the actuating shaft S1 and the action of the biasing spring 18 to thereby raise the driven sprocket DS and the actuating shaft S1 up and down in opposition to the motion of lever 16A.

The vertical shaft 20 is an externally concentric drive shaft which passes through journal bushings 22 in the upper surface 12A of the base 12 and a vertically spaced journal bushing 24 defining a port in a bracket 26 mounted on a main support partition 28 which is welded to the base 12 at 28A and which is channeled-shaped in cross-section with the web of the channel facing toward the bracket 26. Immediately above the bracket 26 and the journal bearing 24 the external drive shaft 20 is provided with a collar 20A maintained in place thereon by suitable pins 20B, which collar 20A extends beyond the end of the external drive shaft 20 to form coaxial recess externally concentric with both the internal drive shaft S1 and the external drive shaft 20.

Immediately above the biasing spring 18 and mounted in fixed relationship for rotation with the external drive shaft 20 is a clutch spline or gear wheel DSB which cooperates with an internally toothed drive spline or sprocket DSC mounted concentrically with the shaft S1 on the upper face of the driven sprocket DS such that when the drive or lift tab 16E raises the shaft S1 and the driven sprocket DS upward, it also raises the driving spine DSC upward into engagement with the externally serrated edge of the driven spline or clutch sprocket DSB to thereby cause rotation of the external drive shaft 20.

The internal drive shaft S1 is coupled by a toothed end coupling CFA to a mating toothed end coupling CFB on an internal vertically extending and coaxial second shaft S2 which comprises an impeller shaft and which extends upwardly into a reservoir R of the soup dispenser 10 of the present invention.

Fitted into the collar 20A is a second external drive shaft 30 which has an end coupling 30A which cooperates with a conformally shaped end coupling 20C on the lower external drive shaft 20 to couple the two shafts together for rotation in response to the engagement of the clutch splines or sprockets DSB and DSC under the actuation of the lever 16A.

The second external drive shaft 30 is externally concentric with a major portion of the impeller shaft S2 and extends upwardly into journal bearings 32 and other related structure which will be hereinafter more fully described with reference to the dispensing apparatus and mechanism mounted in the lower portion of the Reservoir R.

The second outer drive shaft 30 terminates at its uppermost end in an annular flange 30B which includes alternating pluralities of drive pin ports 30C and ventilating ports 30D, the former being adapted to receive drive pins 34 for the purpose of preventing relative rotation between the second outer drive shaft 30 and the volumetric transfer plate TP of the soup dispenser 10, the said volumetric transfer plate TP having a hub section TH which is engaged by the said drive pins 34.

Figure 3:
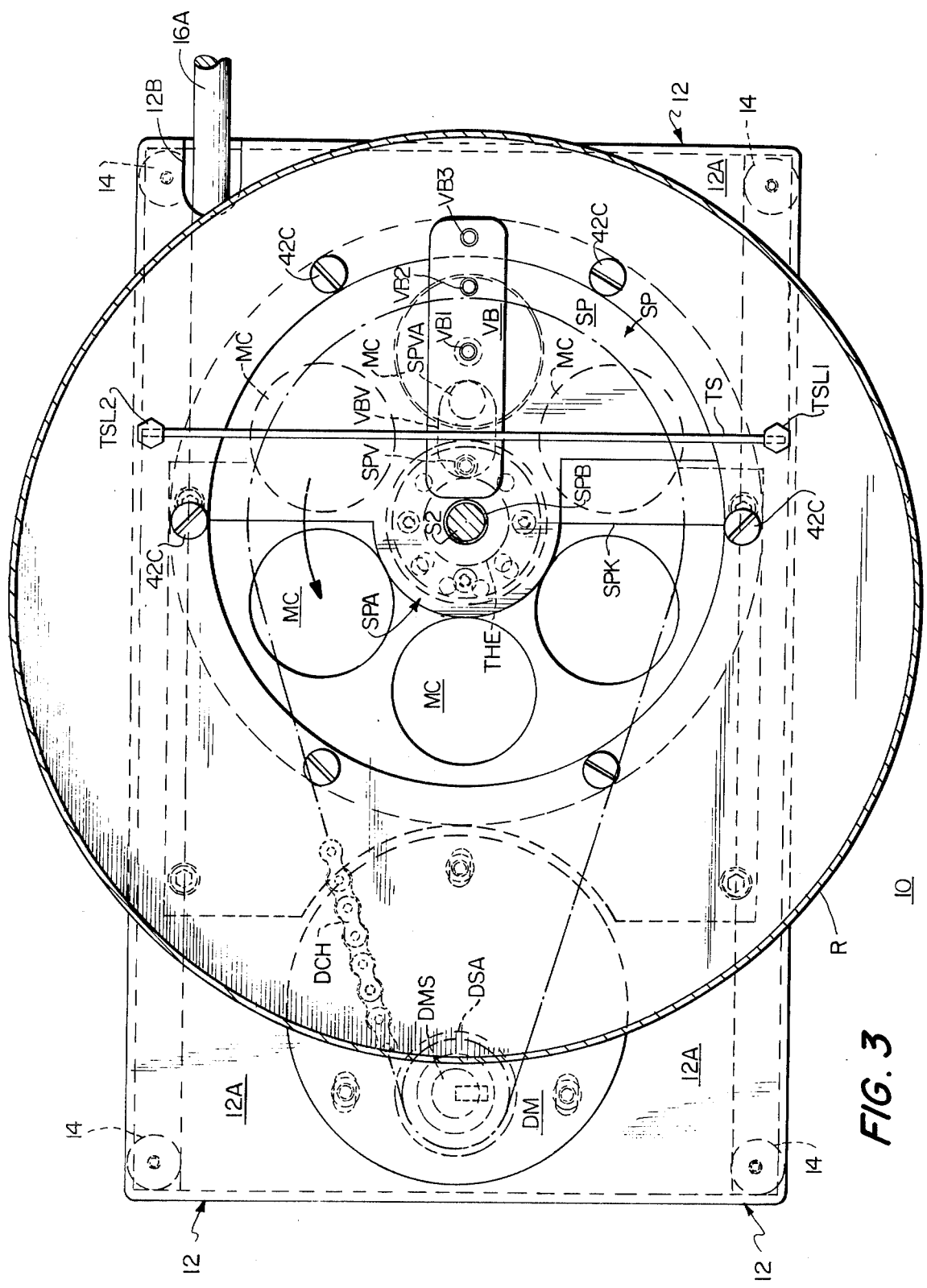
FIG. 3, is a cross-section taken along line 3—3 of FIG. 2.
Figure 6B:
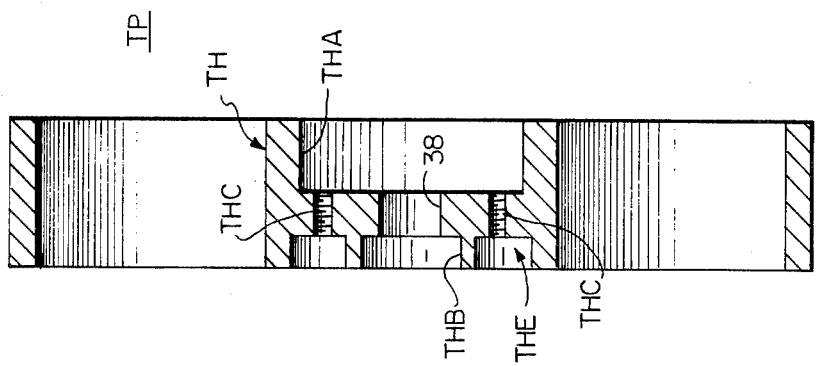
FIG. 6B, is a cross-section taken along line 6—6 of FIG. 6A.
Figure 6A:
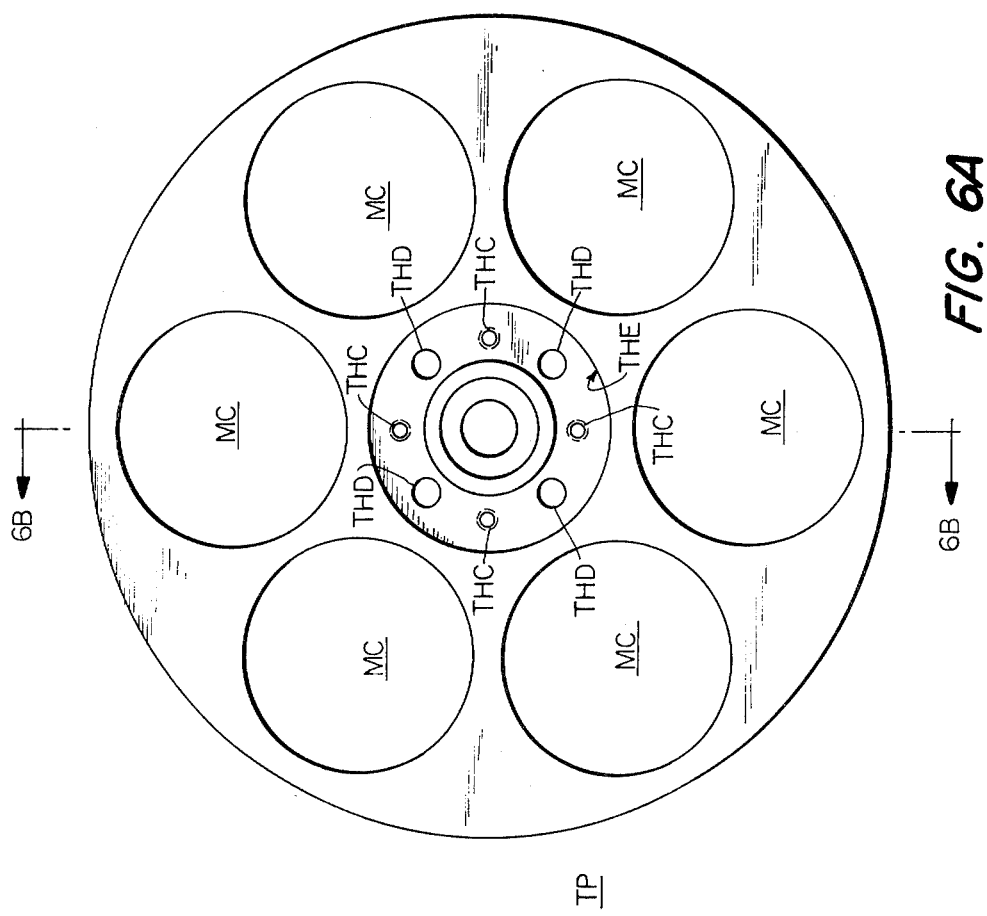
FIG. 6A, is a top plan view of a transfer plate of the present invention.

Referring additionally to FIGS. 6A and 6B in conjunction with FIGS. 1, 2 and 3 the hub section TH of the transfer plate TP is shown as including a bottom counter-bore THA at the center thereof which is sized to receive the annular flange 30B at the top of the second outer drive shaft 30 and a top counter bore THB which is for the purpose for receiving a shaft packing 36 through which the impeller shaft S2 extends coaxially with the bottom and top counter-bores THA and THB respectively. The said counter-bores are joined by a connecting bore 38 through which the upper drive or impeller shaft S2 extends and thence on through a bore 40 in a sealing plate SP which will be more fully described hereinafter with additional reference to FIGS. 4A, 4B and 4C.

The central hub section TH of the transfer plate TP includes a plurality of drive pin receiving holes THC in registry with the drive pin receiving holes 30C in the top flange 30B of the second outer drive shaft 30. Likewise, the vent holes 30D in the upper flange of the second outer drive shaft 30 are in registry with a like plurality of vent holes THD through the central hub portion TH of the transfer plate TP. Both the plurality of pin receiving holes THC and the vent holes THD are located in a web section defined in an annular vent port THE which is externally concentric to the upper counter-bore THB in the hub portion TH.

The dial-like transfer plate TP further includes a symmetrically disposed array of cylindrical measuring cavities MC, defined by bores formed completely through the transfer plate TP in the provision of a dial-shaped configuration of measuring cavities MC disposed with their centers on a circle concentric with the axis of rotation of the impeller shaft S2, the second external drive shaft 30 and the transfer plate TP itself.

Now, with additional reference to FIGS. 5A and 5B, together with FIGS. 1,2 and 3, it is shown that the transfer plate TP is journalled for rotation in a housing 42 having a comformally shaped cylindrical cavity 42A therein which receives the transfer plate TP. The cavity 42A is bounded on one side by a coextensive web 42B which defines the bottom of the housing 42 and which also defines a lower extremity of the overall reservoir assembly R to which the said housing 42 is fastened by suitable screw fasteners 42C or other suitable fastening means.

The housing 42A includes a first central bore 42C which is sized to receive the journal bearing or bushing 32 which centers the upper outer drive shaft 30 with respect to the reservoir R and the transfer plate TP.

A discharge opening DO is defined in the web 42B of the transfer plate housing 42 and is of the same size and configuration as each of the multiplicity of measuring cavities MC in the transfer TP, such that incremental rotation of the transfer plate TP will bring the measuring cavities MC into sequential registry with the discharge opening DO in the web 42B of the housing 42.

Diametrically opposed to the position of the discharge opening DO in the housing 42, in a symmetrical array covering approximately 90° of arc, are four vent passages VP which communicate with the lower counter-bore THA of the transfer plate hub TH to provide venting for each measuring cavity MC when the latter is in registry with the discharge opening DO as will be more fully described hereinafter with reference to the operation of the present invention.

As shown in FIGS. 5A and 5B a plurality of threaded bores 42D are provided about the periphery of the housing 42 which are adapted to receive the threaded fasteners 42C illustrated in FIG. 2 and FIG. 1.

Additional threaded bores 42E are provided in the lower web 42B in a triangular array outboard of the vent ports VP such that they are in registry with a like plurality of thumb wheel or thumb screw holes 44 in a bracket plate 44 which is welded and extends over the top portion of the upright partition or vertical support bracket 28 which in turn is mounted in the upper surface 12A of the base 12. A plurality of thumb screws 46 are provided to hold the tank assembly R including the housing 42 transfer plate TP and related dispensing apparatus on to the bracket 44.

The bracket 44, of course, is relieved so as not to interfere with discharge of material from the discharge opening DO in the bottom web 42B of the transfer plate housing 42.

Also mounted on the front end of the soup dispenser 10 beneath the discharge opening DO, either in proximity with the bracket 24 as shown in dotted lines in FIGS. 1 and 2, or as shown in solid lines on the upper surface 12A of the base 12 in FIGS. 1 and 2, is a drain rack 48 for receiving a container to be filled from the discharge opening and the said drain rack 48 is so positioned as to be centered beneath the discharge opening DO.

In the upper dotted line position of the drain rack 48 the latter is shown as mounted on a bracket 50 comprised of symmetrical ears or angles welded on to the vertical support partition 28 at welds 50A. The rack 50 is adapted to position a container such as a bowl or the like beneath the discharge opening DO above the drain rack 48 either by sitting on the drain rack or sitting on the bracket 50 above the drain rack 48 as the case may be.

Mounted on the opposite end of the base stand 12 on the upper surface 12A thereof is a drive motor DM having a drive motor shaft DMS extending through the surface 12A into the interior of the stand 12 where the drive sprocket DSA is mounted on the drive shaft DMS to thereby drive the driven sprocket DS by means of a suitable driving chain DCH (FIG. 3).

The bracket 50 is assisted in its container centering function by a cut-away portion 44F on the bracket 44 which is cut-away as illustrated in FIGS. 1 and 2 to envelop or partially surround the discharge opening DO without encumbering the latter.

Referring now to FIGS. 4A, 4B, 4C in conjunction with FIGS. 1, 2 and 3, the sealing plate SP of the present invention will now be described.

Basically, the sealing plate SP is semi-circular in configuration with an extended smaller radius semi-circular hub portion SPA which is oriented in opposition to the remaining semi-circular portion of the sealing plate SP. At the center of the hub portion SPA is a shaft port SPB through which the impeller shaft S2 extends and which is also coaxially disposed with the central port 38 in the center hub section TH of the transfer plate TP.

Also, the radius of the extended hub portion SPA coincides with the external radius of the central hub portion TH such that the annular vent port THE carrying the pin and vent holes which extend through the transfer plate hub section TH is covered at the interior of the reservoir. Also, in the configuration shown, a vent hole SPV is disposed in the sealing plate SP overlying the annular vent port THE in the center hub TH of the transfer plate TP such that a vent hole THD is in communication with the vent SPV when one of the measuring cavities MC is in registry with the discharge opening DO.

An additional vent hole SPVA is spaced from the first vent hole SPV in the sealing plate SP and the latter communicates directly with the top of a given one of the measuring cavities MC which is in a registry with the discharge opening DO. Two additional holes in line with the vent holes SPV and SPVA are fastener holes F1 and F2 for receiving fastening devices to attach the sealing plate SP to a vent block VB to be hereinafter more fully described.

Also, the second vent hole SPVA communicates through the top of the sealing plate SP into a relieved shallow chamber SPC which is identical in size and configuration to the measuring cavities MC, such that the vent hole SPVA is provided with some clearance to permit adequate venting when a measuring chamber MC is in registry with the relieved chamber SPC and the discharge opening DO.

The vent block VB is shown as further including fastener ports or mounting holes VB1 and VB2 which are coaxial, respectively, with the fastener holes F1 and F2 in the sealing plate SP. An additional outermost fastening hole or port VB3 is provided which has its bore axis parallel to and on a line with the axes of the bores VB1 and VB2 and is coaxially aligned with a receiving port 42D which receives one of the fasteners 42C maintaining the vent block VB, the reservoir R and the housing 42 of the transfer plate TP all unitized as one end of the vent block VB by means of a fastener 42C.

The sealing plate SP also includes a knife-edge SPK which extends from one side of the hub portion SPA to the outer periphery of the sealing place SP.

The diametric extent of the knife-edge SPK is sufficient to extend entirely across the open upper end of each of the measuring cavities MC in the transfer plate TP such that when the transfer plate is rotated in the housing 42, the measuring chamber MC will pass beneath the knife-edge SPK and in the case of stews and chunky soups or other food products containing solids or semi-solids, the knife edge SPK will trim and shear any excess food particles which tend to extend above the measuring chamber MC. Thus, when a measuring chamber is filled with food and passes beneath the knife-edge SPK it will contain a known nominal amount of food such as, for example, two ounces. In this way, each time a measuring chamber MC discharges a quantity of food through the discharge opening DO in the housing 42 into a waiting container C (FIG. 1), each such discharge represents a known measured quantity of food product.

Therefore, with the present invention it is a simple expedient to vary the size of a given serving merely by counting the number of discharges of known quantities which enter a container. In the case of two ounce nominal servings, for example, an 8-ounce serving would be achieved by 4 discharges through the discharge opening DO. Depending upon the speed of the transfer plate TP the discharges would be individual and distinct or would at least be in the form of surges or pulses which would be audible or could be felt by the operator of the soup dispenser 10.

Extending upward from the sealing plate SP and the vent block VB in the transfer plate TP is the impeller shaft S2 upon which an impeller assembly IMP is mounted, the latter comprising a lower impeller blade assembly IMPA and an upper impeller blade assembly IMPB and a gripping knob K which is threadably received on the top or upper end of the impeller shaft S2 where it may be grasped to remove the shaft S2 and the impeller assembly IMP from the reservoir for cleaning.

To complete the soup dispenser assembly, there is provided a temperature compensating hold-down spring TS which as shown in FIGS. 1, 2 and 3 comprises a single spring wire which is bowed upwardly over and in juxtaposition with the top of the vent block VB above the vent block chamber VBV. The outboard ends of the compensating spring TS are mounted in keeper lugs TSL1 and TSL2 on opposite sides and outboard of the outer dimension of the transfer plate housing 42. The temperature compensating spring TS cooperates with the sealing plate SP to provide a sliding seal for the reservoir R to preclude leakage around the transfer plate TP and transfer plate housing 42 in the vicinity of the discharge opening DO. The surface of the sealing plate SP which is juxtaposed with the upper surface of the transfer plate TP is impregnated with teflon or nylon such that it is provided with a sliding sealing coating to assist the sealing action therebetween. Both sides of the transfer plate TP are likewise coated or impregnated such that the transfer plate provides a good sliding seal with the web section 42A of the transfer plate housing 42, the said web section of inner surface 42A also being impregnated or coated in a like manner.

Thus, in summary, all of the rotating or relatively moving parts at the lower part of the reservoir which assist in the discharge of food products from the reservoir through the discharge opening DO, which are in sliding contact one with the other, have on their juxtaposed surfaces, suitable impregnation or coating with TEFLON or nylon or the like to provide good relatively friction free sliding seals therebetween.

Futhermore, by virtue of the fact that all of these parts are held together under the action of the temperature compensating spring TS, expansion or contraction of the respective parts due to temperature changes does not cause binding or jamming since the compensating spring TS permits relative movement by way of expansion and contraction without losing the sealing effect.

The reservoir R is provided with a wrap-around form of heating means similar to those used in CROCK-POT style cookers, but for the sake of simplicity, this heating means is not shown in conjunction with the present invention.

Also, the drive motor DM is provided with suitable external electric connections illustrated schematically in FIG. 2 as a male connector plug DP.

OPERATION OF THE INVENTION

Referring to FIGS. 1, 2 and 3, and assuming that the drive motor DM is energized and running such that the drive motor shaft DMS is rotating, thereby rotating the driving sprocket DSA and the clutch idler sprocket or driven sprocket DS by way of the chain drive DCH, and assuming also that a measuring chamber MC is in full registry with the discharge opening DO from the last dispensing cycle such that there is no further food product being dispensed from the discharge opening DO, a typical dispensing cycle of the soup dispenser 10 is as follows:

The knob 16 on the actuating arm 16A is grasped and displaced downwardly thereby rocking the rocker arm 16C about the pivots 16D1 and 16D2 to raise the actuating tab 16E up beneath the bottom of the first driven shaft S1. This causes the driving sprocket DS to be raised upward against the action of the spring 18 and cause the interior teeth of the clutch sprocket DSC to engage the exterior teeth on the clutch disc DSB and thus drive the outer drive shaft 20 in rotation and in synchronism with the inner shaft S1.

The inner shaft S1, in the meantime, by virtue of its coupling CFA engaged with the coupling CFB on the shaft S2, has been rotating the impeller assembly IMP by means of the drive motor DM and drive chain DCH, etc., so long as the drive motor DM is energized and rotating.

As clearly illustrated the blade sections IMPA and IMPB of the impeller IMP are oriented so as to cause an upward flow of any solid materials in the reservoir R to maintain a relatively homogenized food product that does not permit any solids or semisolids therein to settle to the bottom of the reservoir R.

The rotation of the lower outer drive shaft 20, by means of the coupling 20C engaging a mating coupling 30A on the upper outer drive shaft section 30, causes rotation of the transfer plate TP by way of the flange 30B and hub means TH. This results in a sequence of registrations between the various vent holes 44D, 42D, the lower hub vent chamber THA, the vent holes THB, the vent holes 30D, the upper annular vent part THE and the hub TH, the vent hole SPV in the sealing plate SP and thence through the vent cavity VBV of the vent block VB and out through the second vent hole SPVA in the sealing plate SP into the measuring chamber MC which is in registry with the discharge opening DO.

It is in this manner of registry of all of the various vent ports through the discharge mechanism that air is provided above the food product in each successive measuring chamber MC to permit rapid gravitational discharge therefrom through the discharge opening DO. The air flow through the various vent holes is illustrated in FIG. 2 by a chain of arrows designated AF.

With the venting established for each discharge of each measuring chamber MC through the discharge opening DO, various quantities of food products may be dispensed by counting, either manually or automatically by way of controlled or programmed incremental rotation, the number of measuring chambers MC which are permitted to discharge a known quantity of food products through the discharge opening DO to provide sufficient food products for a predetermined serving such as, for example, a ten (10) ounce serving which would consist of five (5) two (2) ounce measuring chambers having been dispensed through the discharge opening DO.

As can be seen in FIG. 3, the uppermost of the discharge chambers MC (the direction of rotation being illustrated as counterclockwise) fill up as they appear from beneath the sealing plate SP and are exposed to the material in the reservoir R and thence pass 180° into immediate proximity with the knife edge STK which thereupon scrapes across the top of the transfer plate TP and prevents an undue amount of solids or semi-solids from protruding above a given measuring chamber MC to thereby provide uniform incremental amounts of food presented in sequence to the discharge opening DO.

In further explanation of the operation of the present invention, it can be readily seen that all of the various components and parts of the reservoir and dispensing apparatus which are directly involved in the dispensing of the food product from the reservoir R are readily disassembled for cleaning by removing a few simple screws or pins and the entire assembly including the transfer plate TP, transfer plate housing 42, drive shaft 30, impeller shaft S2, impeller IMP, the sealing plate SP and the vent block VB are all readily removable and may be individually sterilized between serving cycles. This is absolutely essential in the use of food dispensing equipment for feeding large numbers of people in order to preclude undesirable bacteria and other effects.

As can be seen from the foregoing specification and drawings, this invention provides a versatile and highly desirable food product dispensing device for liquid, chunky and semi-solid food products.

The present invention may be modified as would occur to one of ordinary skill in the art without departing from the spirit and scope of the present invention.

I claim:

1. A dispensing assembly for dispensing one or more incremental volumes of liquid or semi-liquid food product from the bottom of a reservoir by gravity filling and emptying, comprising:
    a rotary dial shaped plate means having a circular pattern of substantially identically configured measuring chambers formed therin and extending therethrough parallel to a central axis of rotation;
    a conformal housing for said dial plate means open at its top and having a supporting web across the bottom thereof coextensive with said dial plate means, said supporting web having a discharge opening formed therein of substantially identical configuration as said measuring chambers for successive registry therewith in response to rotations of said dial plate means on said central axis of rotation within said housing; and
    sealing plate means fixed from rotation on said housing over said dial plate means having a fixed hub portion and a sealing portion, the latter overlying an area on said dial plate means coincident with the said discharge opening and surface areas adjacent thereto and greater than the cross-sectional area of a said measuring chamber;
    said fixed hub portion being diametrically opposite said sealing portion and of a lesser radial extent;
    a first vent port in said sealing plate means adjacent said fixed hub portion;
    said dial plate means including a central hub portion coaxial with said fixed hub portion and having a vent chamber and a an annular vent port therein communicating with each measuring chamber and positioned in registration with said first vent port; and
    said sealing portion including a second vent port interconnected with said first vent port and said vent chamber and annular vent port in said central hub portion and in registry with said discharge opening through successive ones of said measuring chambers.

2. The dispensing assembly defined in claim 1, wherein said dispensing assembly further includes vent block means overlying said sealing portion and having a vent passage therein interconnecting said first and second vent ports.

3. The dispensing assembly defined in claim 1, wherein the top and bottom surfaces of said dial plate means, the bottom surface of said sealing plate means and the top surface of said supporting web are covered with a friction reducing sealing material; and
    wherein said dispensing assembly further includes spring means adjacent said housing applying sealing pressure between said covered surfaces to allow for thermal expansion and contraction in said dispensing assembly.

4. The dispensing assembly of claim 1, which further includes an impeller shaft journalled in said fixed and central hub portions for independent rotation therein; and
    a drive shaft journalled for rotation in said housing and externally concentric with said impeller shaft including an end flange portion fixed to said central hub portion for imparting rotation to said dial plate means;
    said end flange portion and said supporting web including third and fourth vent ports, respectively, communicating from atmosphere to said vent chamber in said central hub portions.

5. The dispensing assembly of claim 4, which further includes vent block means overlying said sealing portion and having a vent passage therein interconnecting said first and second vent ports.

6. The dispensing assembly of claim 1, wherein the top and bottom surfaces of said dial plate means, the bottom of said sealing plate means and the top surface of said supporting web are covered with a friction reducing sealing material;
    wherein said dispensing assembly further includes spring means adjacent said housing applying sealing pressure between said covered surfaces to allow for thermal expansion and contraction in said dispensing assembly; and
    which further includes vent block means overlying said sealing portion and having a vent passage therein interconnecting said first and second vent ports.

7. The dispensing assembly of claim 1, wherein the top and bottom surfaces of said dial plate means, the bottom surface of said sealing plate means and the top surface of said supporting web are covered with a friction reducing sealing material;

wherein said dispensing assembly further includes spring means adjacent said housing applying sealing pressure between said surfaces covered with said friction reducing sealing material to allow for thermal expansion and contractions in said dispensing assembly;

which further includes an impeller shaft journalled in said fixed and central hub portions for independent rotation therein; and a drive shaft journalled for rotation in said housing and externally concentric with said impeller shaft including an end flange portion fixed to said central hub portion for imparting rotation to said dial plate means;

said end flange portion and said supporting web including third and fourth vent ports, respectively, communicating from atmosphere to said vent chamber in said central hub portion.

8. The dispensing assembly of claim 7, which further includes vent block means overlying said sealing portion and having a vent passage therein interconnecting said first and second vent ports.

9. The dispensing assembly of claim 1, which further includes intermittent drive means selectively rotating said dial plate means in said housing; and wherein said sealing plate means includes knife means overlying said dial plate means and said measuring chambers therein at a position prior to the registration of each of said measuring chambers with said discharge opening in said housing in the direction of rotation of said intermittent drive means.

10. The dispensing assembly of claim 1, which further includes an impeller shaft journalled in said fixed and central hub portions for independent rotation therein; and a drive shaft journalled for rotation in said housing and externally concentric with said impeller shaft including an end flange portion fixed to said central hub portion for imparting rotation to said dial plate means;

said end flange portion and said supporting web including third and fourth vent ports, respectively, communicating from atmosphere to said vent chamber in said central hub portions; and wherein said dispensing assembly further includes continuous drive means engaged with said impeller shaft and intermittent drive means driven by said continuous drive means and selectively engagable therewith connected with said drive shaft.

11. The dispensing assembly of claim 10, wherein said sealing plate means includes knife means overlying said dial plate means and said measuring chambers therein at a position prior to the registration of each of said measuring chambers with said discharge opening in said housing in the direction of rotation of said intermittent drive means.

12. Means for dispensing a selected number of incremental quantities of liquid and semi-liquid food products from a reservoir, comprising:

a tank defining a reservoir for said food product;
a base for said dispensing means including means mounting said tank above said base;
drive means mounted on said base;
a dispensing assembly selectively actuated by said drive means and extending across a substantial bottom portion of said tank; and
clutch means on said base selectively engaging said drive means with said dispensing assembly;

said dispensing assembly comprising:
impeller shaft means extending from and rotated by said drive means through said bottom portion of said tank;
impeller means on said impeller shaft means for rotation in said reservoir tank in response to actuation of said drive means;
drive shaft means externally concentric with said impeller shaft means and selectively rotatable by said clutch means;
a rotary transfer means driven by said drive shaft means including a plurality of measuring chambers formed therein defining equal incremental volumes and open to receive the contents of said reservoir tank;
a housing for said rotary transfer means having a discharge opening therein positioned beneath and for sequential registry with said measuring chambers in response to rotation of said transfer means;
sealing means for masking and sealing that portion of said transfer means and said measuring chambers above and adjacent to said discharge opening; and
vent means including venting ports in said housing, said transfer means and said sealing means, interconnected during the sequential registry of said measuring chambers with said discharge opening for enhancing the discharge of said incremental volumes of food products for said discharge openings.

13. The invention defined in claim 12, wherein said sealing means comprises a sealing plate overlying said rotary transfer means and defining an intake opening through which said measuring chambers communicate with said tank.

14. The invention defined in claim 13, wherein said intake opening is defined at one side thereof by a knife edge, said knife edge cooperating with said measuring chambers to cut off excess solids entering a given measuring chamber in response to rotation of said transfer means.

15. The invention defined in claim 13, wherein said impeller means is adjacent to and extends over said intake opening defined by said sealing plate.

16. The invention defined in claim 15, wherein said intake opening is defined at one side thereof by a knife edge, said knife edge cooperating with said measuring chambers to cut off excess solids entering a given measuring chamber in response to rotation of said transfer means.

17. The invention defined in claim 15, wherein said impeller means is continuously driven by said drive means.

18. The invention defined in claim 17, wherein said intake opening is defined at one side thereof by a knife edge, said knife edge cooperating with said measuring chambers to cut off excess solids entering a given measuring chamber in response to rotation of said transfer means.

19. A dispensing assembly for dispensing volumes of liquid or semi-liquid food product from the bottom of a reservoir by gravity filling and emptying, comprising:

a rotary dial shaped plate means having a circular pattern of substantially identically configured measuring chambers formed therein and extending therethrough parallel to a central axis of rotation;

a conformal housing for said dial plate means open at its top and having a supporting web across the bottom thereof coextensive with said dial plate means, said supporting web having a discharge opening formed therein of substantially identical configuration as said measuring chambers for successive registry therewith in response to rotations of said dial plate means on said central axis of rotation within said housing;

sealing plate means fixed from rotation on said housing over said dial plate means and overlying an area on said dial plate means coincident with the said discharge opening and surface areas adjacent thereto and greater than the cross-sectional area of a said measuring chamber and defining an intake port in registry with successive ones of said measuring chambers during rotation of said dial plate means; and said sealing plate means including vent port means in registry with said discharge opening through successive ones of said measuring chambers.

20. The dispensing assembly defined in claim 19, wherein said rotary dial shaped plate means includes top and bottom surfaces and wherein the top and bottom surfaces of said rotary dial shaped plate means are covered with a friction reducing sealing material; and wherein said dispensing assembly further includes spring means applying sealing pressure at said surfaces covered with said friction reducing material to allow for thermal expansion and contraction in said dispensing assembly.

* * * * *